United States Patent
Jin et al.

(10) Patent No.: US 9,869,447 B2
(45) Date of Patent: Jan. 16, 2018

(54) LIGHT MODULE WITH LED AND OLED DIODES

(71) Applicant: Valeo Vision, Bobigny (FR)

(72) Inventors: Hui Jin, Paris (FR); Christophe Dubosc, Villemomble (FR); David Hue, Butry sur Oise (FR); Boubacar Sagna, Sartrouville (FR)

(73) Assignee: VALEO VISION, Bobigny (FR)

( * ) Notice: Subject to any disclaimer, the term of this patent is extended or adjusted under 35 U.S.C. 154(b) by 150 days.

(21) Appl. No.: 14/853,223

(22) Filed: Sep. 14, 2015

(65) Prior Publication Data
US 2016/0076729 A1   Mar. 17, 2016

(30) Foreign Application Priority Data
Sep. 15, 2014   (FR) ..................... 14 58668

(51) Int. Cl.
| | |
|---|---|
| *B60Q 1/26* | (2006.01) |
| *F21V 5/00* | (2015.01) |
| *B60C 1/00* | (2006.01) |
| *F21S 8/10* | (2006.01) |
| *B60Q 1/30* | (2006.01) |
| *B60Q 1/38* | (2006.01) |

(Continued)

(52) U.S. Cl.
CPC .............. *F21V 5/00* (2013.01); *B60C 1/0041* (2013.01); *B60Q 1/2607* (2013.01); *F21S 48/215* (2013.01); *F21S 48/217* (2013.01); *F21S 48/23* (2013.01); *F21S 48/238* (2013.01); *F21S 48/24* (2013.01); *B60Q 1/30* (2013.01); *B60Q 1/38* (2013.01); *B60Q 1/44* (2013.01); *F21W 2101/12* (2013.01); *F21W 2101/14* (2013.01); *F21Y 2105/00* (2013.01); *F21Y 2113/20* (2016.08);

(Continued)

(58) Field of Classification Search
CPC ....... B60C 1/0041; B60C 1/2607; B60C 1/30; B60C 1/38; B60C 1/44; F21S 48/215; F21S 48/217; F21S 48/23; F21S 48/238; F21S 48/24; F21V 5/00; F21W 2101/12; F21W 2101/14; F21Y 2105/00; F21Y 2113/20; F21Y 2115/15; F21Y 2115/10
See application file for complete search history.

(56) References Cited

U.S. PATENT DOCUMENTS

| | | |
|---|---|---|
| 6,280,480 B1 | 8/2001 | Tuttle et al. |
| 6,814,475 B2 | 11/2004 | Amano |

(Continued)

FOREIGN PATENT DOCUMENTS

| | | |
|---|---|---|
| DE | 102007041817 A1 | 3/2009 |
| DE | 102008013604 A1 | 9/2009 |

(Continued)

OTHER PUBLICATIONS 10-2009-0111828, Korea, May 2011—English Translation.*

*Primary Examiner* — Peggy Neils
(74) *Attorney, Agent, or Firm* — Oblon, McClelland, Maier & Neustadt, L.L.P.

(57) ABSTRACT

A light module, notably for a motor vehicle, comprising a first light source of light-emitting diode type and a second surface light source of the organic light-emitting diode type suitable for reflecting the light rays emitted by the first light source in order to form a light beam along an optical axis of the module. The module further comprises a collimator suitable for deflecting the light rays emitted by the first source in a main direction and meeting the second light source with a non-zero angle of incidence β.

20 Claims, 3 Drawing Sheets

(51) Int. Cl.
*B60Q 1/44* (2006.01)
*F21W 101/12* (2006.01)
*F21W 101/14* (2006.01)
*F21Y 105/00* (2016.01)
*F21Y 115/15* (2016.01)
*F21Y 113/20* (2016.01)
*F21Y 115/10* (2016.01)

(52) U.S. Cl.
CPC ........ *F21Y 2115/10* (2016.08); *F21Y 2115/15* (2016.08)

(56) References Cited

U.S. PATENT DOCUMENTS

| | | | |
|---|---|---|---|
| 8,186,849 B2 | 5/2012 | Helbig et al. | |
| 8,950,979 B2 | 2/2015 | Sanchez et al. | |
| 9,016,894 B2* | 4/2015 | Aurongzeb | H01L 25/048 257/40 |
| 9,206,956 B2* | 12/2015 | Speier | F21S 8/04 |
| 2003/0053318 A1 | 3/2003 | Amano | |
| 2009/0067169 A1 | 3/2009 | Helbig et al. | |
| 2013/0027959 A1 | 1/2013 | Sanchez et al. | |
| 2014/0070724 A1* | 3/2014 | Gould | F21V 13/02 315/291 |
| 2015/0062946 A1* | 3/2015 | Fukai | B60Q 1/26 362/516 |
| 2016/0061397 A1* | 3/2016 | Ito | F21S 48/1163 362/520 |

FOREIGN PATENT DOCUMENTS

| | | | |
|---|---|---|---|
| EP | 2453167 A1 | 5/2012 | |
| EP | 2505911 A2 | 10/2012 | |
| FR | 2956468 A1 | 8/2011 | |
| KR | 10-2009-0111828 * | 5/2011 | ................ F21V 5/00 |
| WO | 2011107904 A1 | 9/2011 | |

* cited by examiner

LIGHT MODULE WITH LED AND OLED DIODES

CROSS-REFERENCE TO RELATED APPLICATIONS

This application claims priority to the French application 1458668 filed on Sep. 15, 2014, which application is incorporated herein by reference and made a part hereof.

BACKGROUND OF THE INVENTION

1. Field of the Invention

The invention deals with the field of lighting and/or light signaling, notably for motor vehicles. More specifically, the invention deals with the field of lighting and light signaling by means of light-emitting diodes (LED) and of organic light-emitting diodes (OLED).

2. Description of the Related Art

The published patent document FR 2 956 468 A1, which is equivalent to U.S. Publication No. 2013/0027959 now issued as U.S. Pat. No. 8,960,979, discloses (FIG. 4) a light module for a motor vehicle, comprising a first surface light source of the OLED type and a second light source, also surface, and of the OLED type. The two OLED diodes are arranged parallel to one another, the rays emitted by the first toward the second being reflected by the latter in order to form a light beam. To this end, the rays reflected by the second diode pass through the first diode to form the light beam. The second light source thus provides a dual function, namely a first reflecting surface function and a second lighting function. In effect, the second diode can be powered independently of the first while ensuring its function of reflection of the rays emitted by the first. The light rays emitted by the two diodes can thus be emitted independently and complement one another. The light module of this teaching is consequently advantageous in that it makes it possible to complement a light beam produced by one of the sources with the light beam from the other source. It does however present the drawback of a significant portion of the rays emitted and/or reflected by the second diode having to pass through the first diode. The fact of having to pass through the first diode in effect provokes not-inconsiderable light losses.

SUMMARY OF THE INVENTION

The aim of the invention is to propose a light module that mitigates at least one of the drawbacks of the prior art, more particularly of the above-mentioned prior art. More particularly, the aim of the invention is to propose a light module provided with a surface light source, such as an OLED diode, and that makes it possible to ensure a number of lighting and/or signaling functions effectively.

The subject of the invention is a light module, notably for a motor vehicle, comprising: a first light source of the semiconductor type; a second surface light source of the organic light-emitting diode type suitable for reflecting the light rays emitted by the first light source in order to form a light beam along an optical axis of the module; noteworthy in that it further comprises an optical device suitable for deflecting the light rays emitted by the first light source in a main direction, the rays meeting the second light source with a non-zero angle of incidence $\beta$.

Advantageously, the optical device is arranged in such a way as to deflect the light rays emitted by the first light source such that its rays reach a part, for example a bottom part, only of the second surface source.

The second surface light source of the organic light-emitting diode type is reflecting. Advantageously, it consists of a superposition of a number of organic semiconductor layers between two electrodes, of which one is transparent and the other is reflecting. The reflecting electrode is arranged at the rear relative to the direction of propagation of the light beam along the optical axis.

According to an advantageous embodiment of the invention, the optical device comprises a translucent or transparent element forming at least one, preferentially two, diopter(s).

According to an advantageous embodiment of the invention, the optical device is a collimator.

According to an advantageous embodiment of the invention, the first light source consists of one or more light-emitting diodes. The or each of these sources has a main surface area of less than 30 mm$^2$, even less than 5 mm$^2$.

The second surface light source has a main surface area greater than 100 mm$^2$.

According to an advantageous embodiment of the invention, the light-emitting diode or diodes of the first light source illuminate in a half-space delimited by a mean plane forming an angle $\alpha$ of less than 70°, preferentially less than 60°, more preferentially less than 50°, with the perpendicular to the mean plane of the corresponding second light source.

According to an advantageous embodiment of the invention, the angle of incidence $\beta$ of the rays outgoing from the optical device with the second light source is greater than 10°, preferentially 15°, more preferentially 20°.

According to an advantageous embodiment of the invention, the optical device is arranged optically between the first and second light sources.

According to an advantageous embodiment of the invention, the second light source forms an angle $\gamma$ with a direction at right angles to the optical axis of the module, which lies between 3° and 30°, preferentially between 5° and 25°, more preferentially between 8° and 20°.

According to an advantageous embodiment of the invention, the second light source is inclined in the direction of the light beam relative to a direction at right angles to the optical axis of the module.

According to an advantageous embodiment of the invention, the light beam formed by reflection on the second light source is a first beam, the second light source being suitable for producing a second light beam. Advantageously, the first and second beams each produce a part, even all, of a distinct photometric regulatory function. As a variant, the first and second beams can together produce a regulatory photometric function.

According to an advantageous embodiment of the invention, the first beam corresponds to a brake indicator function for a motor vehicle and/or the second beam corresponds to a side marker indicator function for a motor vehicle.

According to an advantageous embodiment of the invention, the second light source extends transversely to the optical axis of the module beyond the first light source.

According to an advantageous embodiment of the invention, the second light source comprises two organic light-emitting diodes extending transversely to the optical axis in directions that are generally opposing and inclined in the direction of the light beam relative to a direction at right angles to the optical axis of the module.

According to an advantageous embodiment of the invention, the first light source comprises two sets of spot light-emitting diodes, each set being arranged so as to illuminate one of the two surface organic light-emitting diodes, respectively.

According to an advantageous embodiment of the invention, the two sets of diodes of the first light source are arranged, respectively, on two walls that are inclined relative to the optical axis so as to form a cavity with an aperture directed toward the front of the module, the module comprising a third light source arranged in the cavity and suitable for forming an additional light beam.

According to an advantageous embodiment of the invention, the optical device is a first optical device, the module comprising a second optical device in the cavity, suitable for deflecting the light rays emitted by the third light source along the optical axis in order to form the additional light beam.

According to an advantageous embodiment of the invention, the additional light beam corresponds to a direction indicator function for a motor vehicle.

According to an advantageous embodiment of the invention, the second light source comprises a number of light zones which can be powered independently.

Another subject of the invention is a light device, notably a lighting and/or signaling device, for a motor vehicle, comprising: a casing; a light module housed in the casing; noteworthy in that the light module conforms to the invention.

Advantageously, the light device comprises a number of light modules according to the invention.

The provisions of the invention are advantageous in that they make it possible to effectively exploit the property of reflection of a surface diode of the OLED type. They thus make it possible to complement, via this reflection effect, a light beam emanating from an OLED diode with a complementary beam emitted by spot diodes of the LED type. The light beam produced by reflection on the second light source does not need to pass through a semi-reflecting surface, as in the above-mentioned prior art.

These and other objects and advantages of the invention will be apparent from the following description, the accompanying drawings and the appended claims.

BRIEF DESCRIPTION OF THE
ACCOMPANYING DRAWINGS

Other features and advantages of the present invention will be better understood from the description and the drawings, in which.

DETAILED DESCRIPTION OF THE
PREFERRED EMBODIMENTS

Figure 1:
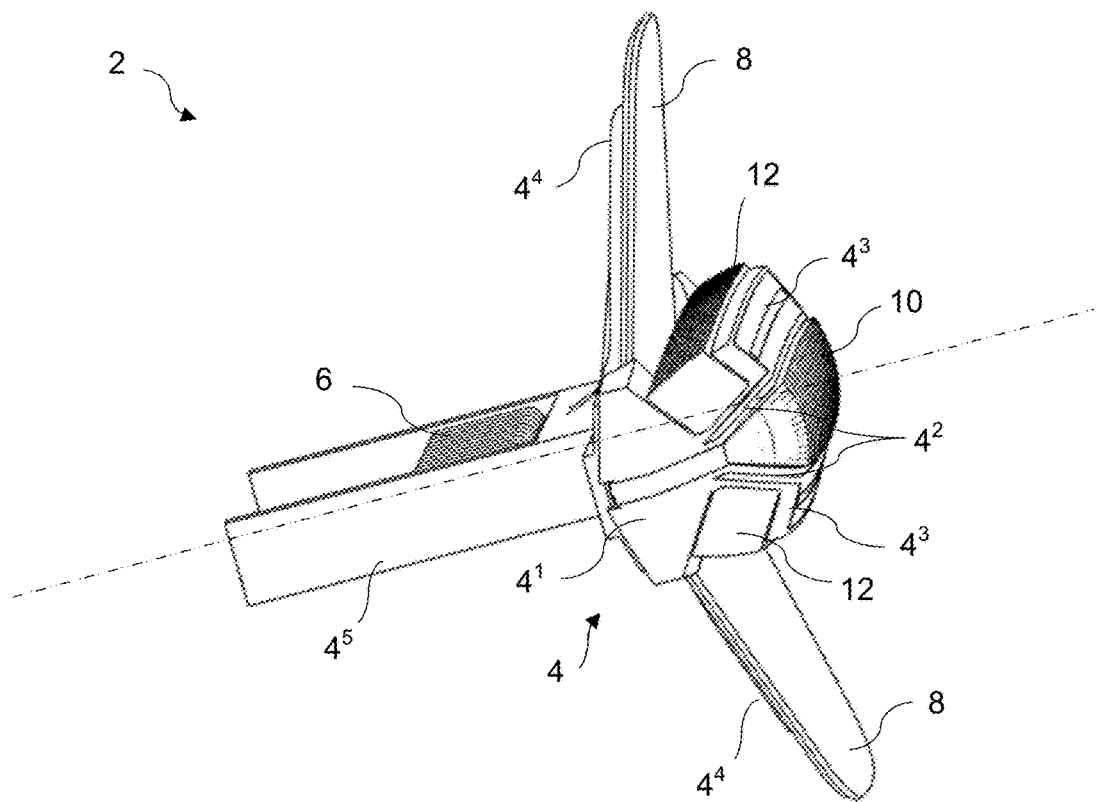
FIG. 1 is a perspective view of a light module according to the invention.
Figure 2:
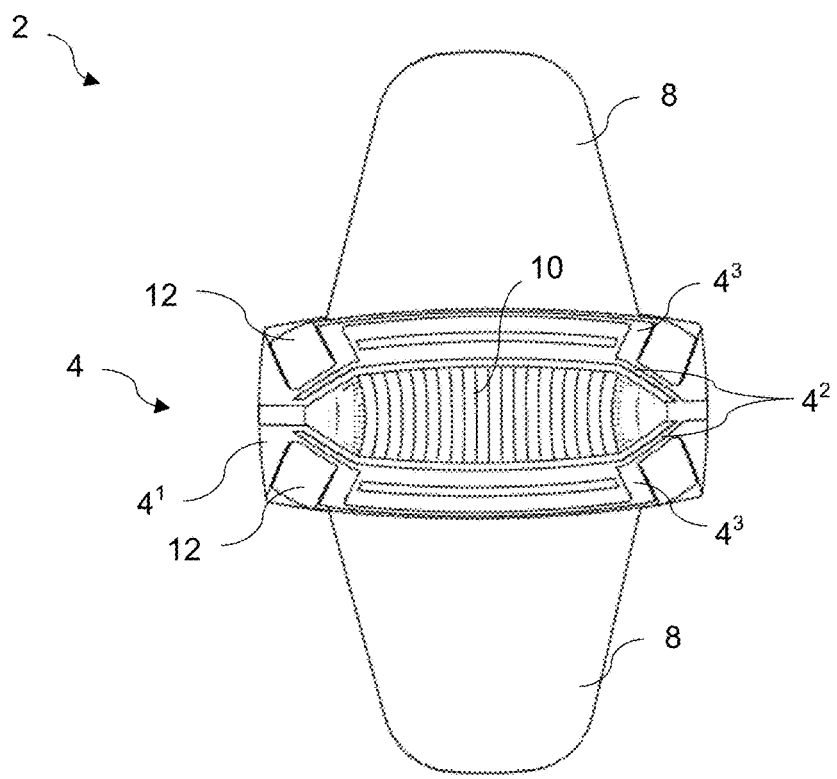
FIG. 2 is a front view of the module of FIG. 1.

FIGS. 1 and 2 illustrate a light indicator module for a motor vehicle. The module 2 is configured to be housed in a casing arranged at the rear of the vehicle. It is configured to ensure a side marker light (or rear light) function, a stop light function and a direction indicator (or flashing) function.

The module 2 comprises a substrate 4 provided with a central part $4^1$, two lateral walls $4^2$, two front walls $4^3$ protruding from the lateral walls $4^2$, two supports $4^4$ and a rear part $4^5$. The rear part $4^5$ is configured to co-operate with an electrical power supply connector 6. The two lateral walls $4^2$ form a cavity housing light sources (not visible in FIGS. 1 and 2) and a collimator 10 in order to form a light beam for a direction indicator function. The supports $4^4$ are arranged in such a way as to protrude from the central part $4^1$ of the substrate 4 essentially opposite one another. Each of these supports $4^4$ supports a surface diode of the OLED type 8. An OLED is a light-emitting diode comprising a superposition of a number of organic semiconductor layers between two electrodes, of which one is transparent. The substrate 4 of the module 2 also supports one or more light sources (not visible in FIGS. 1 and 2) between the lateral walls $4^2$ and the OLED diodes 8, this or these light source(s) being covered by a collimator 12 in order to ensure a stop light function. More specifically, the rays emitted by these light sources are deflected by the collimator 12 to meet the front face of the corresponding OLED diode 8 and be reflected there toward the front of the module 2.

The longitudinal axis of the module 2 represented in FIG. 1 corresponds to its optical axis. This means that the different light beams produced by the module 2 are oriented essentially along this axis. All these beams are preferentially directed toward the front of the module 2 (corresponding to the right in FIG. 1 and at the rear of the vehicle).

The collimators 10 and 12 are parts made of transparent or translucent material, such as glass or polycarbonate (PC) or polymethylmethacrylate (PMMA). They comprise input and/or output surfaces oriented in such a way as to deflect the rays in a main direction, by applying the Snell-Descartes refraction principle. The input and output faces in effect each form a diopter, namely a surface separating two homogeneous and isotropic transparent media, of different refractive indices. The refractive index of air is in effect of the order of 1 whereas that of glass and of polycarbonate lies between approximately 1.4 and 1.6. The principle of operation of a collimator is well known in itself to those skilled in the art; there is consequently no need to provide more detail thereof.

The substrate 4 is made of plastic material produced by molding and supports the light sources and the electrical tracks, in accordance with the MID (molded interconnect device) technology.

Figure 3:
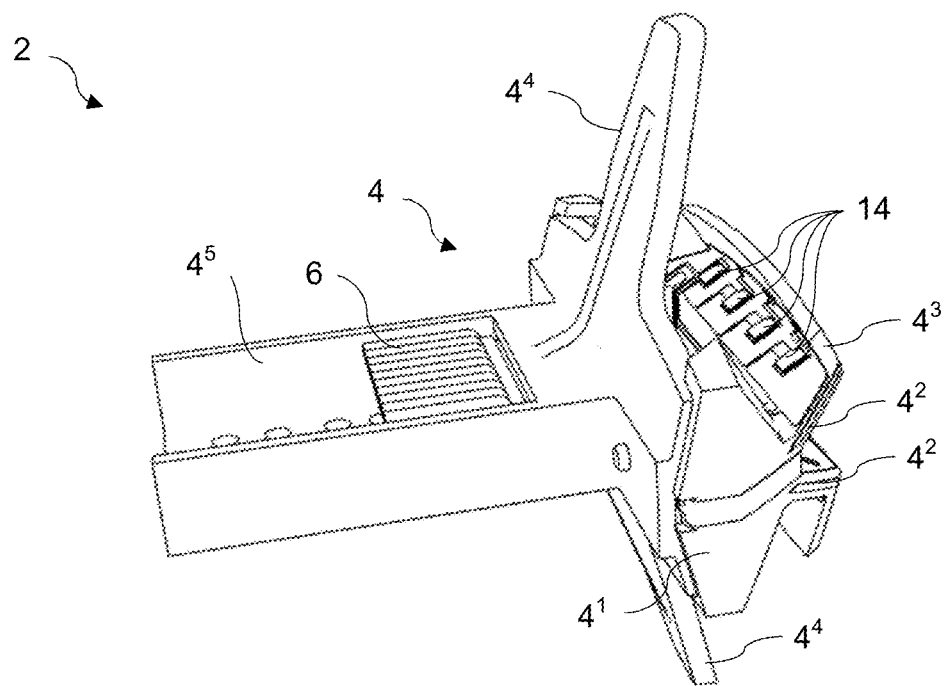
FIG. 3 is a perspective view of the module of FIGS. 1 and 2, the module being without its collimators.
Figure 4:
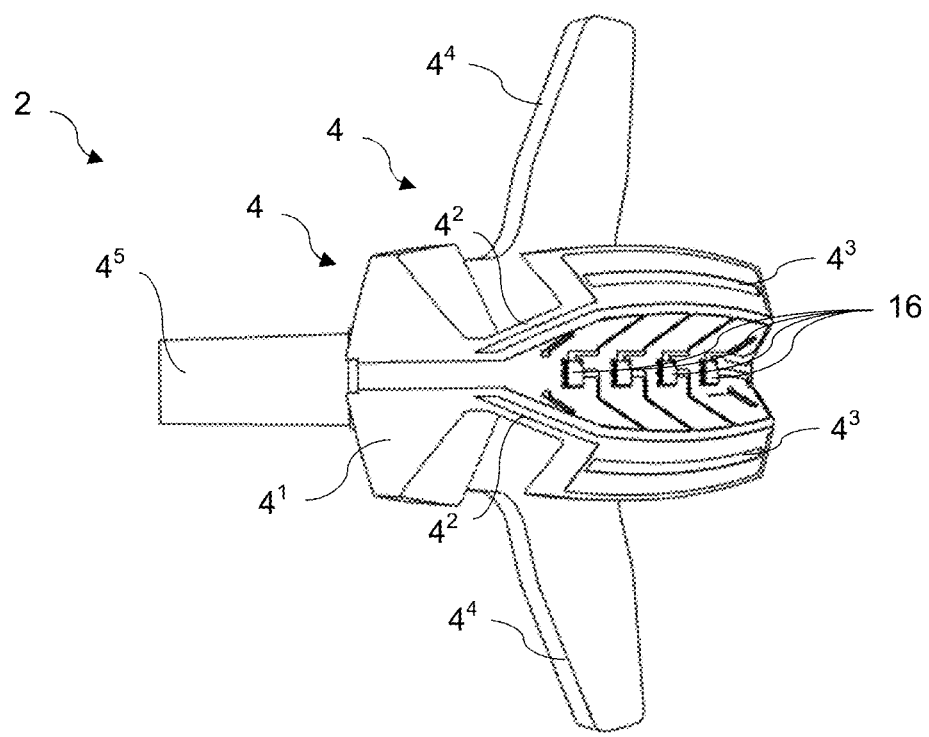
FIG. 4 is a view of the module of FIG. 3 from another perspective angle.

FIGS. 3 and 4 illustrate the light module 2 of FIGS. 1 and 2, but the module 2 being without the collimators 10 and 12, and the OLED diodes 8.

FIG. 3 highlights the LED diodes 14 (mentioned previously in relation to FIGS. 1 and 2) arranged between the lateral walls $4^2$ and the supports $4^4$ of the substrate 4. More specifically, these LED diodes 14 are arranged directly on the rear face of the upper lateral wall $4^2$ so as to illuminate toward the corresponding OLED diode 8. The LED diodes 14 are distributed transversely to the optical axis so as to essentially illuminate all the width of the corresponding OLED diode 8. Similarly, and symmetrically, LED diodes of the same type are arranged on the rear face of the lower lateral wall $4^2$.

FIG. 4 highlights the LED diodes 16 (also mentioned previously in relation to FIGS. 1 and 2) arranged in the bottom of the cavity formed by the lateral walls $4^2$. These LED diodes 16 are oriented in such a way as to illuminate in the direction of the optical axis. They are distributed transversely to the optical axis so as to occupy the space of the cavity.

The LED diodes 14 and 16 are preferentially glued onto the substrate 4. In effect, because of the thermoplastic nature of the substrate 4, the use of conventional soldering methods for the electrical contacts is not suitable. The LED diodes 14 and 16 are thus fixed mechanically and electrically by the application of a glue based on polymer and filled with metal elements. It is thus a so-called "cold" application method that does not damage the substrate 4. After the glue has polymerized, the latter ensures that the LED diodes 14 and 16 are mechanically and electrically fixed.

Electrical tracks are deposited directly on the substrate 4 for the electrical power supply to the LED diodes 14 and 16. The electrical tracks can be produced by the technology designated by the acronym LDS, which stands for "Laser Direct Structuring". This involves passing a light ray over the corresponding surface of the substrate 4, according to the configuration of the tracks to be produced. The laser ray has the effect of forming a roughness suitable for promoting the bonding. This step is followed by a metallization by dip-coating of the substrate 4 in one or more successive metal baths.

Alternatively, or complementarily, the electrical tracks can be produced by printing of the ink-jet type with ink that includes metal particles.

The tracks can also be produced by a molding of the substrate 4 in two steps, also called "two-shot molding". This is an injection molding process using two different resins in which only one of the two resins can be metallized. Typically, the metallizable resin is ABS and the non-metallizable resin is polycarbonate. The substrate 4 is then subjected to an auto-catalytic deposition process in which butadiene is used to chemically roughen the surface and allow for the adhesion of a primary coat of copper.

Figure 5:
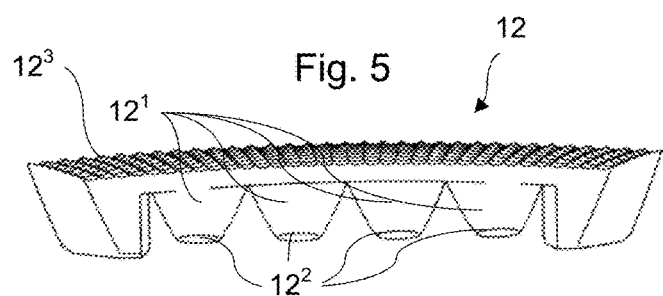
FIG. 5 is a representation of one of the collimators of the module of FIGS. 1 to 4.

FIG. 5 illustrates the collimator 12 intended to be arranged optically between the LED diodes 14 (FIG. 3) and the OLED diodes 8 (FIGS. 1 and 2). As mentioned previously, the collimator 12 consists of an element made of transparent or translucent material, such as polycarbonate for example. Such an element can thus be produced by molding. In this case, the collimator 12 comprises a series of generally conical portions $12^1$ intended to be aligned with the OLED and LED diodes 8 and 14. Each of these portions $12^1$ comprises, at its free and smaller-section end, a cavity forming an input face $12^2$ for the light emitted by the OLED and LED diodes 8 and 14. These input faces $12^2$ thus form first diopters deflecting the rays emitted by the OLED and LED diodes 8 and 14 so as to render them less divergent. These rays are then propagated in a beam corresponding essentially to the form of the conical portions $12^1$. The collimator 12 also comprises facets $12^3$ forming output faces. These output faces thus form second diopters that can deflect the rays a second time. These facets $12^3$ can be oriented in such a way as to locally control the direction of the rays outgoing from the collimator 12. The orientation of the facets $12^3$ can vary along the length and the width of the collimator 12 so as to form the most uniform possible light beam.

Figure 6:
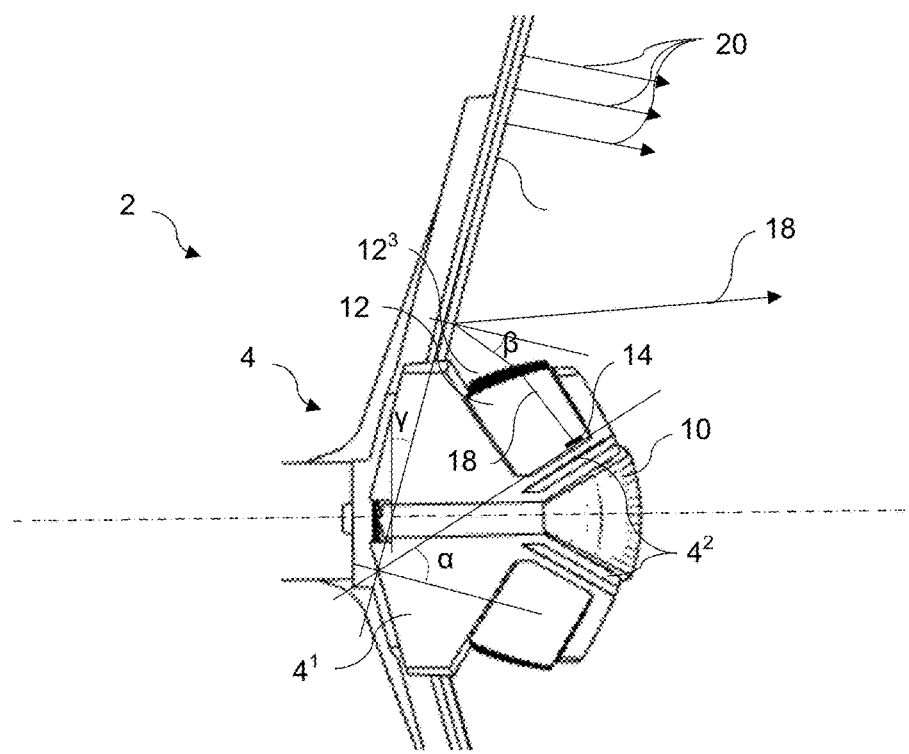
FIG. 6 is a profile view of the module of FIGS. 1 to 4, illustrating the path of a light ray.

FIG. 6 is a side view of the central and upper part of the light module 2 of FIGS. 1 to 4. The path of a ray emitted by one of the LED diodes 14 illuminating one of the OLED diodes 8 is represented therein. The ray 18 is deflected a first time when it penetrates the transparent or translucent material of the collimator 12. This deflection is not visible given the proximity between the LED diode 14 and the corresponding input face of the collimator 12. The ray 18 is propagated essentially in a straight line in the material of the collimator 12 until it reaches the output face, in this case an output facet $12^3$. The ray 18 is then deflected a second time so as to be directed toward a portion of the corresponding OLED diode 8 which is close to the central portion $4^1$ of the substrate 4. In other words, the rays emitted by the diodes 14 are deflected by the collimators 12 so as to meet the corresponding OLED diodes 8 in zones of the OLED diodes 8 which are close to the optical axis.

As mentioned previously, the OLED diodes 8 consist of a superposition of a number of organic semiconductor layers between two electrodes, of which one is transparent. In this case, the electrode situated at the rear is reflecting so that, on the one hand, the light emitted by the semiconductor layers is effectively directed toward the front, and, on the other hand, the rays emitted by the LED diodes 14 toward the OLED diodes 8 are reflected. The electrode situated at the front can consequently be totally or at least mostly transparent.

Still referring to FIG. 6, the LED diodes 14 illuminate in a half-space delimited by the rear face of the lateral wall $4^2$ on which these LED diodes 14 are mounted. This diode mounting face forms a mean plane which forms an angle α with the perpendicular to the mean plane of the corresponding OLED diode 8, this angle α being less than 70°, preferentially 60°, more preferentially 50°. This upper limit of the angle α makes it possible, by virtue of the collimator 12, to illuminate a useful portion of the OLED diode 8. This angle α is moreover preferentially greater than 20°, preferentially 30°, more preferentially 40°. This lower limit of the angle α makes it possible, moreover, to ensure a reflection of the rays by the OLED diode 8 in a direction which corresponds to the optical axis of the module 2.

The LED diodes 14, the collimator 12 and the OLED diode 8 can thus be configured in such a way that the angle of incidence β of the rays outgoing from the collimator 12 lie between 10° and 40°, preferentially between 15° and 35°, more preferentially between 15° and 30°.

The OLED diodes 8 advantageously form an angle γ with a direction at right angles to the optical axis of the module 2, this angle γ being able to lie between 3° and 30°, preferentially between 5° and 25°, more preferentially between 8° and 20°. The OLED diodes 8 are moreover inclined toward the front. The angle γ is greater than 0, preferentially than 3°, so as to allow the formation of the light beam corresponding to the ray 18. This angle γ is also limited so that the light beam produced by the light rays 20 emitted by the OLED diodes 8 is not too divergent relative to the optical axis.

The light beam produced by reflection of the rays 18 from the LED diodes 14 can thus be produced independently of the activation of the OLED diodes 8. In other words, the light beam from the LED diodes 14 can be added to the light beam produced.

Figure 7:
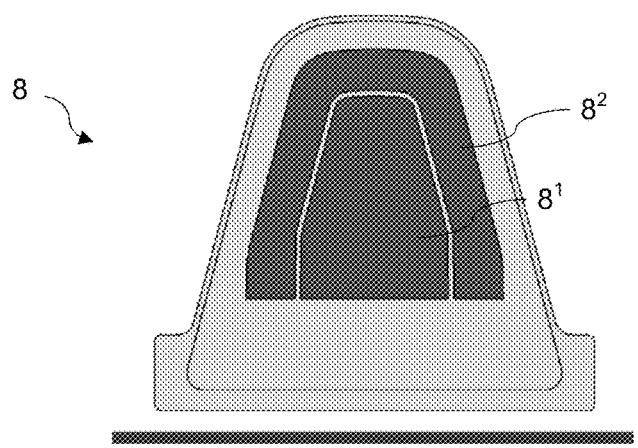
FIG. 7 is a front view of one of the light sources of the OLED type of the module of FIGS. 1 to 4.

FIG. 7 illustrates an example of a surface OLED diode 8 for the module 2 of FIGS. 1 to 6. It can be seen that the OLED diode 8 comprises two lighting zones, namely a first zone $8^1$ and a second zone $8^2$. Each of these zones $8^1$ and $8^2$ can be activated independently.

The module 2 which has just been described can thus ensure a number of light indication functions. In this case, the central part comprising the LED diodes 16 and the collimator 10 housed in the cavity of the substrate 4 can ensure a direction indicator (flashing) function. The surface OLED diodes 8 can ensure a side marker indicator function. The LED diodes 14 with the collimators 12 and the property of reflection of the OLED diodes 8 can ensure a brake indicator function (stop function). In effect, the photometric regulatory requirements are more stringent for the stop function than for the side marker function. The presence of a number of LED diodes 14, more particularly on either side of the optical axis, and the quality of reflection of the surface OLED diodes 8 makes it possible to achieve these requirements.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module, notably for a motor vehicle, comprising:
    a first light source of the semiconductor type;
    a second surface light source of the organic light-emitting diode type suitable for reflecting light rays emitted by said first light source in order to form a light beam along an optical axis of said light module;
    wherein said light module further comprises:
    an optical device suitable for deflecting said light rays emitted by said first light source in a main direction and meeting said second surface light source with a non-zero angle of incidence β;
    wherein said optical device is arranged optically between said first light source and said second surface light source so that said light rays emitted by said first light source pass through said optical device and meet said second surface light source.

2. The light module according to claim 1, wherein said optical device comprises a translucent or transparent element forming at least one diopters(s).

3. The light module according to claim 1, wherein said optical device is a collimator.

4. The light module according to claim 1, wherein said first light source consists of one or more light-emitting diodes.

5. The light module according to claim 4, wherein said light-emitting diode or diodes of said first light source illuminate in a half-space delimited by a plane forming an angle α of less than 70°, preferentially less than 60°, more preferentially less than 50°, with the perpendicular to the mean plane of said second surface light source.

6. The light module according to claim 1, wherein said non-zero angle of incidence β of said light rays outgoing from said optical device with said second surface light source is greater than 10°, preferentially 15°, more preferentially 20°.

7. The light module according to claim 1, wherein said second surface light source forms an angle γ with a direction at right angles to said optical axis of said light module, which lies between 3° and 30°.

8. The light module according to claim 1, wherein said light beam formed by reflection on said second surface light source is a first beam, said second surface light source being suitable for producing a second light beam.

9. The light module according to claim 8, wherein said first beam corresponds to a brake indicator function for a motor vehicle and/or said second light beam corresponds to a side marker indicator function for a motor vehicle.

10. The light module according to claim 1, wherein said second surface light source extends transversely to said optical axis of said light module beyond said first light source.

11. A light module, notably for a motor vehicle, comprising:
    a first light source of the semiconductor type;
    a second surface light source of the organic light-emitting diode type suitable for reflecting light rays emitted by said first light source in order to form a light beam along an optical axis of said light module;
    wherein said light module further comprises:
    an optical device suitable for deflecting said light rays emitted by said first light source in a main direction and meeting said second surface light source with a non-zero angle of incidence β;
    wherein said second surface light source comprises two organic light-emitting diodes extending transversely to said optical axis in directions that are generally opposing and inclined in a direction of said light beam relative to a direction at right angles to said optical axis of said light module.

12. The light module according to claim 11, wherein said first light source comprises two sets of spot light-emitting diodes, each set being arranged so as to illuminate one of said two organic light-emitting diodes, respectively.

13. The light module according to claim 12, wherein said two sets of spot light-emitting diodes of said first light source are arranged, respectively, on two walls that are inclined relative to said optical axis so as to form a cavity with an aperture directed toward a front of said light module, said light module comprising a third light source arranged in said cavity and suitable for forming an additional light beam.

14. The light module according to claim 13, wherein said optical device is a first optical device, said light module comprising a second optical device in said cavity, suitable for deflecting the light rays emitted by said third light source along said optical axis in order to form said additional light beam.

15. The light module according to claim 13, wherein said additional light beam corresponds to a direction indicator function for a motor vehicle.

16. A light device, notably a lighting and/or signaling device, for a motor vehicle, comprising:
    a casing;
    a light module housed in said casing;
    wherein said light module comprises:
    a first light source of the semiconductor type;
    a second surface light source of the organic light-emitting diode type suitable for reflecting light rays emitted by said first light source in order to form a light beam along an optical axis of said light module;
    wherein said light module further comprises:
    an optical device suitable for deflecting said light rays emitted by said first light source in a main direction and meeting said second surface light source with a non-zero angle of incidence β;
    wherein said optical device is arranged optically between said first light source and said second surface light source so that said light rays emitted by said first light source pass through said optical device and meet said second surface light source.

17. The light module according to claim 2, wherein said optical device is a collimator.

18. The light module according to claim 2, wherein said first light source consists of one or more light-emitting diodes.

19. The light module according to claim 3, wherein said first light source consists of one or more light-emitting diodes.

20. The light module according to claim 1, wherein said optical device comprises a translucent or transparent element forming two diopters(s).

* * * * *